US008857765B2

(12) United States Patent
Thomas et al.

(10) Patent No.: US 8,857,765 B2
(45) Date of Patent: Oct. 14, 2014

(54) METHOD AND APPARATUS FOR ATTACHING AN AIRCRAFT FUSELAGE FRAME TO A WING BOX

(71) Applicant: The Boeing Company, Chicago, IL (US)

(72) Inventors: Grant Brian Thomas, Lake Stevens, WA (US); Chun-Liang Lin, Bellevue, WA (US); Francis E. Andrews, Everett, WA (US); Wendell C. K. Choy, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 251 days.

(21) Appl. No.: 13/652,975

(22) Filed: Oct. 16, 2012

(65) Prior Publication Data

US 2014/0103162 A1    Apr. 17, 2014

(51) Int. Cl.
*B64C 1/00*    (2006.01)

(52) U.S. Cl.
USPC ............................... 244/119; 244/131; 244/38

(58) Field of Classification Search
USPC ................ 244/119, 131, 123.7, 123.1, 117 R
See application file for complete search history.

(56) References Cited

U.S. PATENT DOCUMENTS

| 1,865,964 | A | | 7/1932 | Rohrbach |
| 2,001,260 | A | | 5/1935 | Martin |
| 2,211,089 | A | * | 8/1940 | Berlin ....................... 244/117 R |
| 2,370,801 | A | | 3/1945 | Klose |
| 2,412,778 | A | | 12/1946 | Kosek |
| 2,749,061 | A | | 6/1956 | Franz |
| 2,779,558 | A | | 1/1957 | Hereil et al. |
| 3,018,985 | A | | 1/1962 | Voigt |
| 4,390,153 | A | | 6/1983 | Wuermseer |
| 4,417,708 | A | | 11/1983 | Negri |
| 4,893,964 | A | * | 1/1990 | Anderson ..................... 403/376 |
| 6,808,143 | B2 | * | 10/2004 | Munk et al. ................ 244/123.1 |
| 6,843,450 | B2 | * | 1/2005 | Bath et al. ...................... 244/131 |
| 7,195,418 | B2 | * | 3/2007 | Durand et al. ............. 403/408.1 |
| 7,501,814 | B2 | * | 3/2009 | Thwing et al. ................ 324/240 |
| 7,546,979 | B1 | * | 6/2009 | Estell et al. ................ 244/123.1 |
| 7,721,992 | B2 | * | 5/2010 | Keeler et al. .................. 244/119 |
| 7,887,009 | B2 | * | 2/2011 | Keeler et al. .................. 244/131 |
| 7,909,290 | B2 | * | 3/2011 | Cooper ........................ 244/132 |
| 7,975,965 | B2 | * | 7/2011 | Ackermann et al. .......... 244/124 |

(Continued)

FOREIGN PATENT DOCUMENTS

| FR | 2 970 463 | 7/2012 |
| WO | WO 2008/105805 | 9/2008 |

OTHER PUBLICATIONS

U.S. Official Action dated Aug. 19, 2013 in U.S. Appl. No. 13/444,441.

(Continued)

*Primary Examiner* — Christopher P Ellis
*Assistant Examiner* — Medhat Badawi
(74) *Attorney, Agent, or Firm* — Hope Baldauff LLC (57) ABSTRACT

The present disclosure is generally directed to an aircraft body including a fuselage skin on an outboard member of the aircraft body and a wing box extending through a member of the aircraft body. The wing box being enclosed and capable of being pressurized is fixedly attached at an outer surface to at least one pair of an attachment member and an attachment link member that is fixedly attached to the aircraft body.

19 Claims, 8 Drawing Sheets

(56) References Cited

U.S. PATENT DOCUMENTS

| | | | |
|---|---|---|---|
| 8,016,236 B2* | 9/2011 | Grieve et al. | 244/131 |
| 8,061,655 B1* | 11/2011 | Manley et al. | 244/120 |
| 8,142,126 B2* | 3/2012 | Porter et al. | 411/389 |
| 8,146,242 B2* | 4/2012 | Prichard et al. | 29/771 |
| 8,286,911 B2* | 10/2012 | McAlinden et al. | 244/39 |
| 8,371,532 B2* | 2/2013 | Williams et al. | 244/131 |
| 8,408,495 B2* | 4/2013 | Cortes et al. | 244/131 |
| 8,573,539 B2* | 11/2013 | Honorato Ruiz | 244/123.1 |
| 2006/0018710 A1* | 1/2006 | Durand et al. | 403/408.1 |
| 2007/0095982 A1* | 5/2007 | Kismarton et al. | 244/119 |
| 2008/0283666 A1* | 11/2008 | Grieve et al. | 244/131 |
| 2009/0065644 A1* | 3/2009 | Jacques | 244/123.1 |
| 2009/0146007 A1* | 6/2009 | Keeler et al. | 244/119 |
| 2009/0283637 A1* | 11/2009 | Nolla | 244/119 |
| 2010/0200691 A1* | 8/2010 | Gallant | 244/38 |
| 2011/0089292 A1 | 4/2011 | Williams et al. | |
| 2011/0147521 A1* | 6/2011 | Delahaye et al. | 244/119 |
| 2012/0193475 A1* | 8/2012 | Cabanac et al. | 244/131 |
| 2012/0241560 A1* | 9/2012 | Erickson | 244/131 |
| 2012/0286090 A1* | 11/2012 | Guittard et al. | 244/117 R |
| 2012/0286091 A1* | 11/2012 | Kajita et al. | 244/117 R |
| 2013/0020440 A1* | 1/2013 | Honorato Ruiz | 244/131 |
| 2013/0032670 A1* | 2/2013 | Endres et al. | 244/131 |
| 2013/0062467 A1* | 3/2013 | Soenarjo | 244/123.1 |
| 2013/0175395 A1* | 7/2013 | Lucas et al. | 244/131 |

OTHER PUBLICATIONS

International Search Report from PCT/US2013/063913 mailed Mar. 11, 2014.

U.S. Official Action dated Jun. 18, 2014 in U.S. Appl. No. 13/444,441.

* cited by examiner

METHOD AND APPARATUS FOR ATTACHING AN AIRCRAFT FUSELAGE FRAME TO A WING BOX

TECHNICAL FIELD

The following disclosure relates generally to aircraft structures and, more particularly, to aircraft wing-to-body attachments.

BACKGROUND

A significant portion of aircraft final assembly time is spent in joining the wing assembly to the aircraft body. Conventional wing-to-body installation attaches frame stub beams used to splice the outboard wing box to the center wing box as well as to a vertical flange connecting the aircraft body skin to the wing box. The interface to the wing box includes both body stub beams and the wing box stringer details and fasteners. The aircraft body side panel frames are split in two to allow a lower frame segment to deflect relative to the wing to body integration position. This configuration results in added frame weight due to the aircraft body frame splice. Also, the secondary fuel barrier application process contains hazardous fumes, and cannot be fully completed until after this installation is complete. This places an expensive and complex process in the wing to body integration location.

As the foregoing discussion suggests, current methods of joining wings to bodies in aircraft can be both time-consuming and costly, with the added downside that the additional body weight from the numerous fastening systems reduces aircraft performance and fuel efficiency. Accordingly, new methods and systems for joining aircraft wings to bodies that require less time and less structural reinforcement would be desirable. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

An aircraft disclosed herein includes an aircraft body having a fuselage skin on an outboard member of the aircraft body, a wing box extending through a member of the aircraft body, where the wing box being enclosed and capable of being pressurized. At least one pair of an attachment member and an attachment link member is fixedly attached to an outer surface of the wing box and the fuselage skin.

An attachment apparatus for an aircraft disclosed herein includes an aircraft body having a plurality of body frame members on an outboard member of the aircraft body and a wing box extending through a member of the aircraft body. The attachment apparatus includes at least one pair of an attachment member and an attachment link member fixedly attached to an outer surface of the wing box. The attachment member includes an upwardly extending projection that receives the outboard member of the aircraft body, a downwardly extending member that receives the outboard member of the surface of the center wing box, and an inboard extending projection that receives the attachment link member being connected to an inboard outer surface of the wing box. A plurality of fasteners fixedly attached the aircraft body to the attachment member and attachment link member, thereby securing the aircraft body to the wing box.

A method of assembling an aircraft disclosed herein includes constructing a wing box, constructing an aircraft body to be connected to the wing box, attaching at least one attachment member to at least one of an outer surface of the wing box or an outboard member of the aircraft body, aligning the aircraft body for fixed attachment to the wing box, and fastening the aircraft body to the wing box with fasteners via the at least one attachment member.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

DETAILED DESCRIPTION

The following disclosure describes various methods and systems for attaching aircraft wings to aircraft bodies in an efficient manner. As described in greater detail below, in one embodiment an aircraft wing may be attached to an aircraft body by fasteners that allow the aircraft body to be attached to the wing assembly without any fastening devices penetrating the wing assembly. Certain details are set forth in the following description and in FIGS. 1-8 to provide a thorough understanding of various embodiments described herein. However, other details describing well-known structures and systems often associated with aircraft wings, body and aircraft structures in general are not set forth below to avoid unnecessarily obscuring the description of various embodiments described herein.

Many of the details, dimensions, angles and other features shown in the Figures are merely illustrative of particular embodiments described herein. Accordingly, other embodiments can have other details, dimensions, angles and features without departing from the spirit or scope of the embodiments described herein. In addition, those of ordinary skill in the art will appreciate that further embodiments can be practiced without several of the details described below. Additionally, identical reference numbers in the Figures identify identical or at least generally similar elements. The features, functions, and advantages that have been discussed can be achieved independently in various embodiments of the present disclosure or may be combined in yet other embodiments, further details of which can be seen with reference to the following description and drawings.

Figure 1:
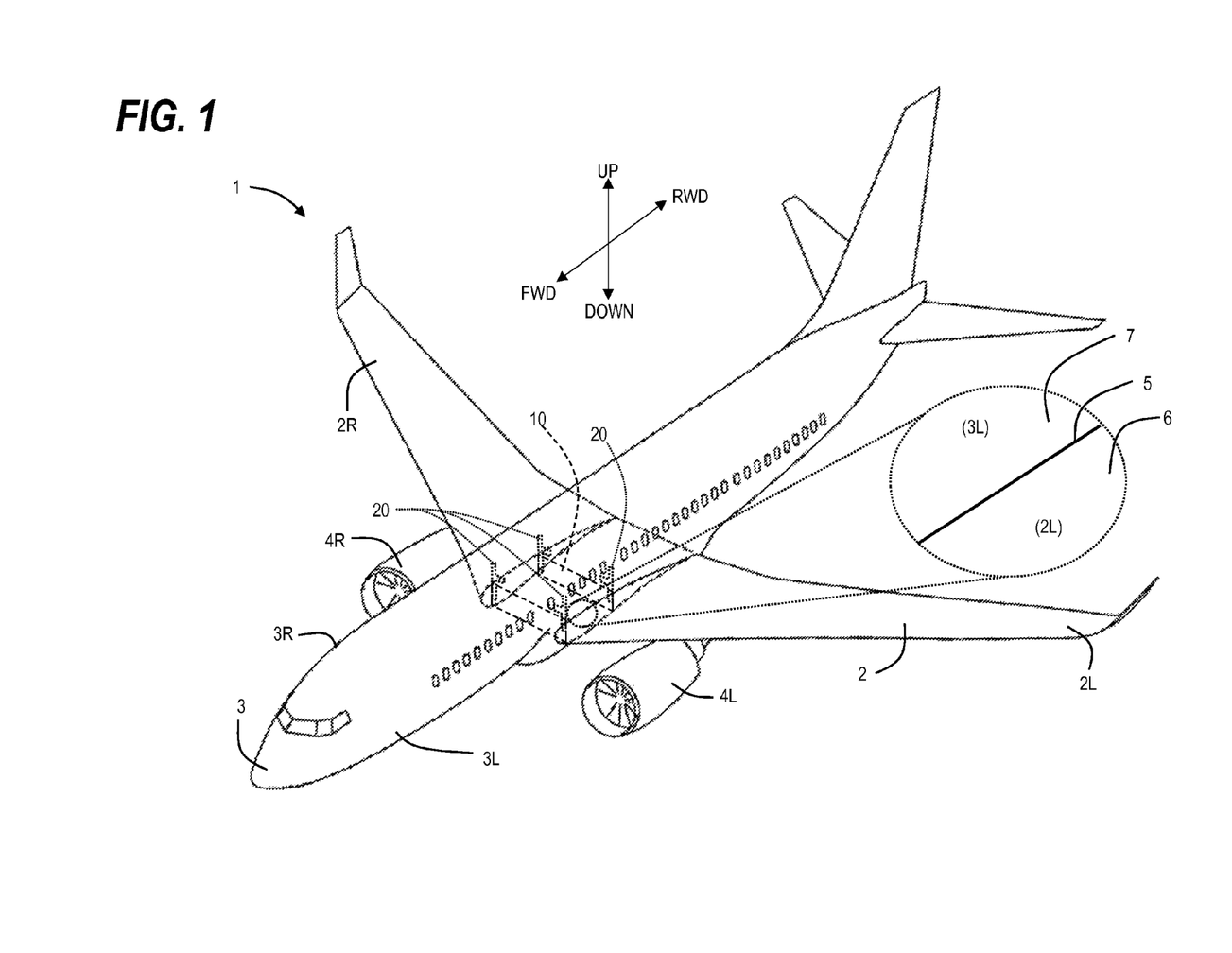
FIG. 1 is a top isometric view of an aircraft having a wing member joined to an aircraft body in accordance with an embodiment disclosed herein.

FIG. 1 is a top isometric view of an aircraft 1 having a wing assembly 2 attached to an aircraft body 3 in accordance with an embodiment presented herein. The aircraft body 3 includes a right aircraft body member 3R and a corresponding left aircraft body member 3L. The wing assembly 2 includes a right wing assembly member 2R extending outwardly from the right aircraft body member 3R, and a left wing assembly member 2L extending outwardly from the left aircraft body member 3L. The wing assembly 2 further includes a wing box 10 extending through at least a member of the aircraft body 3. The wing box 10 structurally attaches the right wing assembly member 2R to the left wing assembly member 2L. Wing assembly members 2R and 2L are joined to the aircraft body members 3R and 3L, respectively, at an adjoining intersection 5, where an outer wing skin 6 of the wing assembly 2 intersects an outer body skin 7 of the aircraft body 3.

The wing box 10 may be completely located within the wing assembly 2 and may further define an interior cavity structure, (not shown), that may include a fuel cell or any other cavity that may be separate compartmentalized and independent from the aircraft body 3. For example, the interior cavity structure defined by the wing box 10 may be pressure tested independently from body 3 pressure testing. This allows testing for any pressure leakage before any aircraft body structure 3 is attached to the wing assembly 2. The wing box further includes a forward and rearward facing surfaces that are disposed in vertical direction The embodiments presented herein are novel methods and systems for adjoining the aircraft body 3 to the wing assembly 2 via the wing box 10 by means of attachment members 20 disposed on forward and rearward lateral edges of the wing box 10, proximate where the outer body skin 7 meets the outer wing skin 6.

In the illustrated embodiment, the aircraft 1 is a commercial aircraft having a first engine 4R carried by the right wing assembly member 2R, and a second engine 4L carried by the left wing assembly member 2L. In other embodiments, however, the methods and systems described herein for attaching wings to bodies can be used on other aircraft, includes other commercial and non-commercial aircraft. For example, other transport aircraft having one or more engines mounted to the aircraft body.

Figure 2:
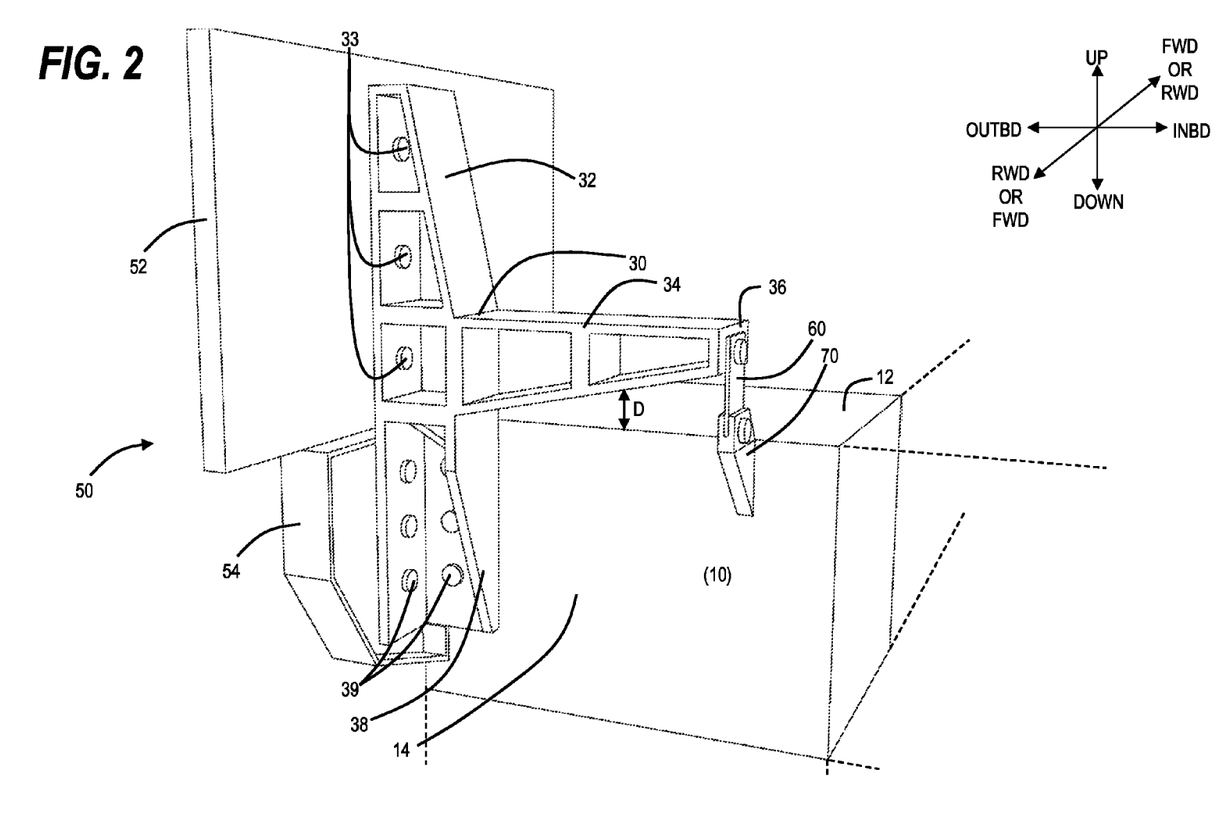
FIG. 2 is a partially cutaway isometric view illustrating a first embodiment of a one-piece attachment member joined to a wing box and a fuselage.
Figure 3:
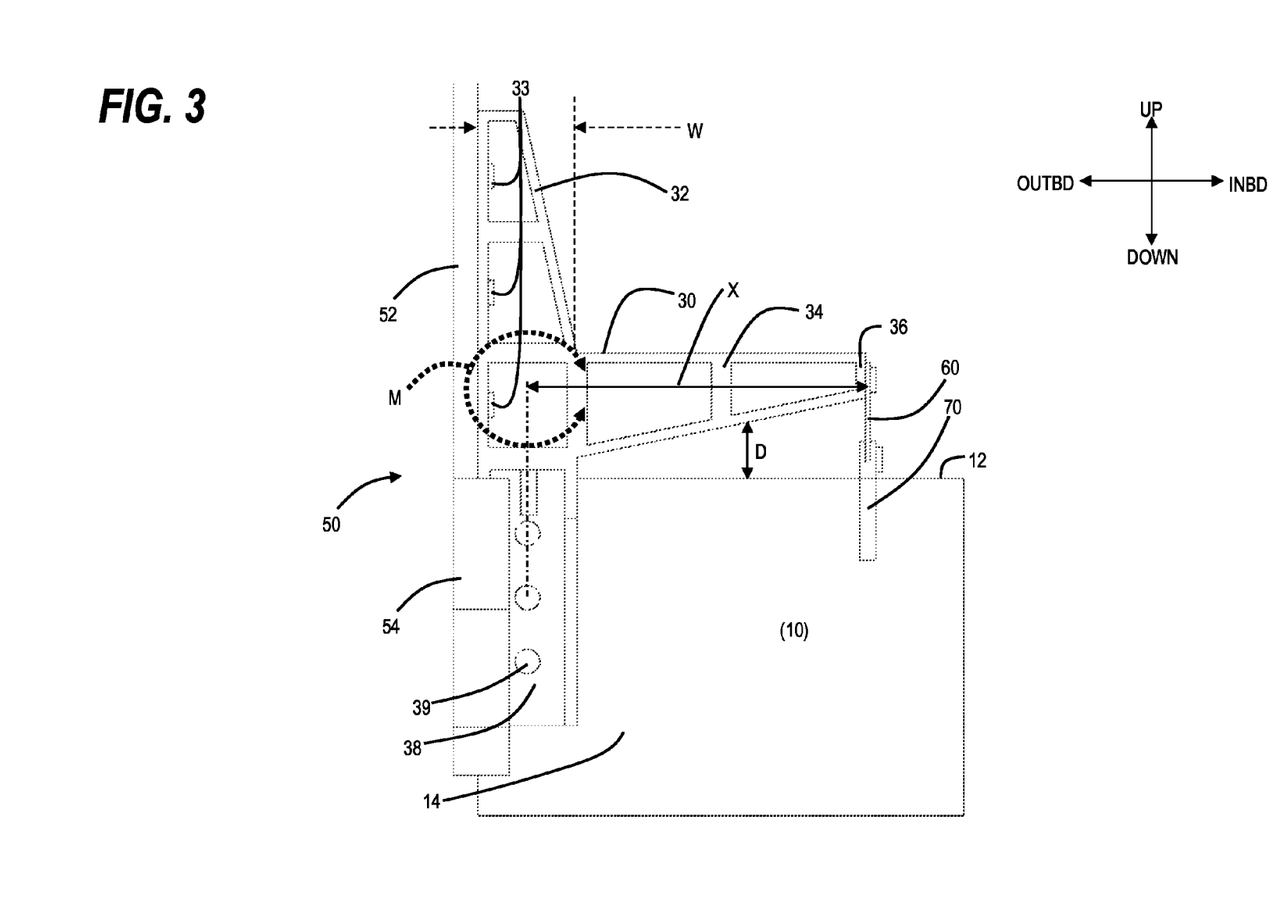
FIG. 3 is a partially cutaway forward or rearward view illustrating the first embodiment of the one-piece attachment member of FIG. 2 joined to a wing box and a fuselage.

FIG. 2 is a partially cutaway isometric view and FIG. 3 is a forward or rearward cutaway view illustrating a first embodiment of a one-piece attachment member 30 joined to a partially illustrated corner section of a wing box 10 and a fuselage structure 50. Wing box 10 is partially illustrated to identify an upper surface 12 of the wing box 10 and either a forward facing or rearward facing outer vertical surface 14 of the wing box 10. This orientation is based on whether the one-piece attachment member 30 is disposed on either the forward facing section of the wing box 10, or on the rearward facing section of the wing box 10, as both are illustrated in FIG. 1. The one-piece attachment member 30 is additionally located on the outboard member of the wing box 10 to enable fixed attachment to the aircraft body 3 via a fuselage member 50 that may including both a fuselage skin 52 and a trapezoid panel 54. A vertical load on the fuselage member 50 may be reduced when used in conjunction with the trapezoid panel 54. The fuselage skin 52 may also encompass the outboard member of the trapezoid panel 54, (not illustrated).

The one-piece attachment member 30 includes an upper extension 32 that is fixedly connected via fasteners 33 to the fuselage member 50, particularly to the fuselage skin 52, and an inboard extension 34 having a distal end 36 opposite the fuselage member 50 being connected via an extension link 60 to a vertical member 14 of the wing box 10 via a wing box fitting 70. Additionally, the one-piece attachment member 30 includes a lower extension 38 that is fixedly connected via fasteners 39 to the vertical member 14 of the wing box 10, and either the trapezoid member 54 or directly to an outboard member of the fuselage skin 52, (not illustrated).

The inboard extension 34 is oriented a distance D above a plane defined by the upper surface 12 of the wing box 10. A bending moment M, (see FIG. 3), increases the resistance or stiffness to any bending moment from any transient or static loading due to the distal end 36 of the inboard extension 34 having a substantial longitudinal separation from the attachment planes of the upper 32 and lower 38 extensions connected to their respective fuselage 52 and wing box 10/trapezoid member 54 fastening locations. The inboard distance X of the distal end 36 of the inboard extension 34 to the centerline of bending moment M is greater than the width W, (see FIG. 3), of the upper 32 and lower 38 extension to accomplish this stiffening feature.

Figure 4:
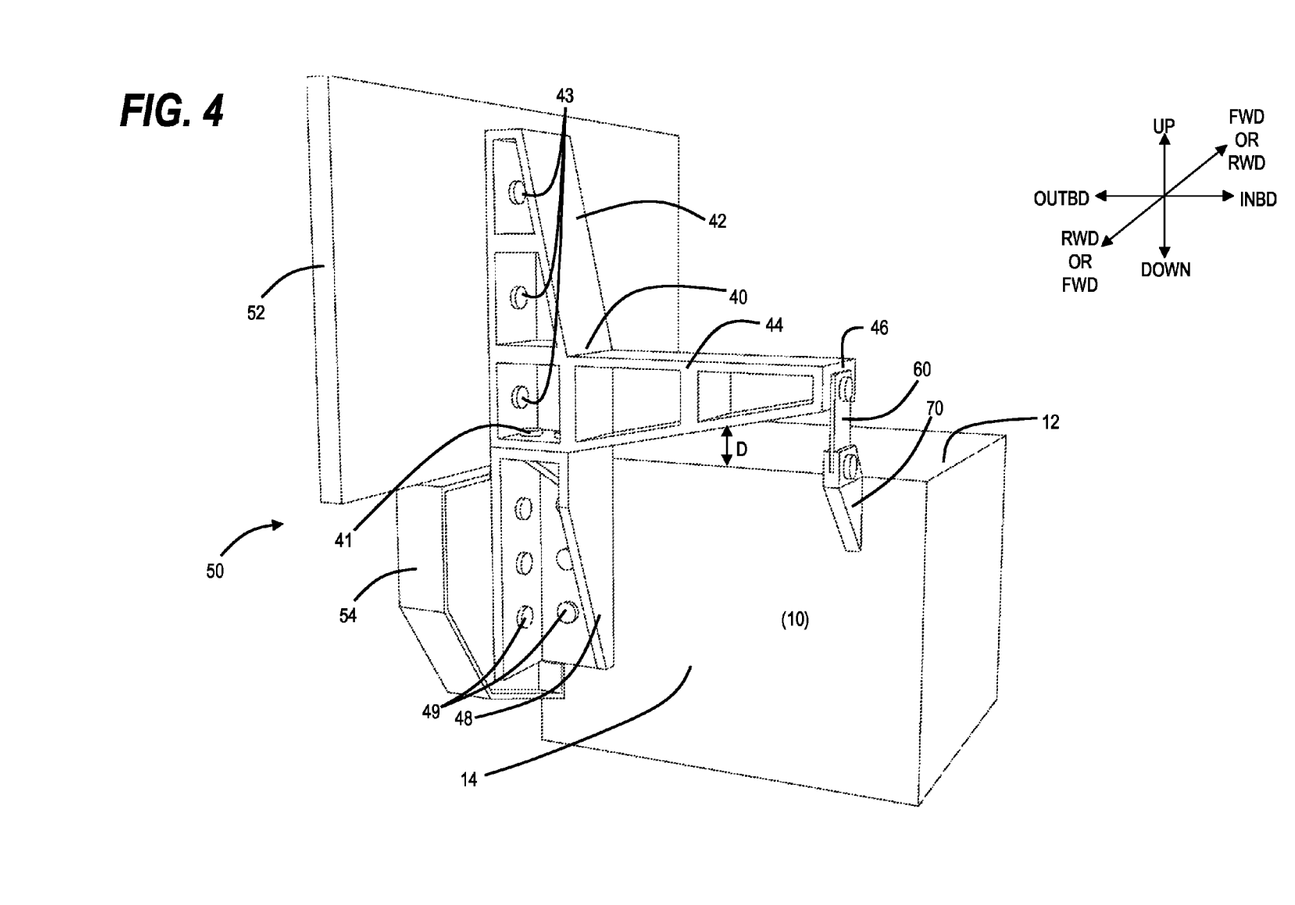
FIG. 4 is a partially cutaway isometric view illustrating a second embodiment of a two-piece attachment member joined to a wing box and a fuselage.
Figure 5:
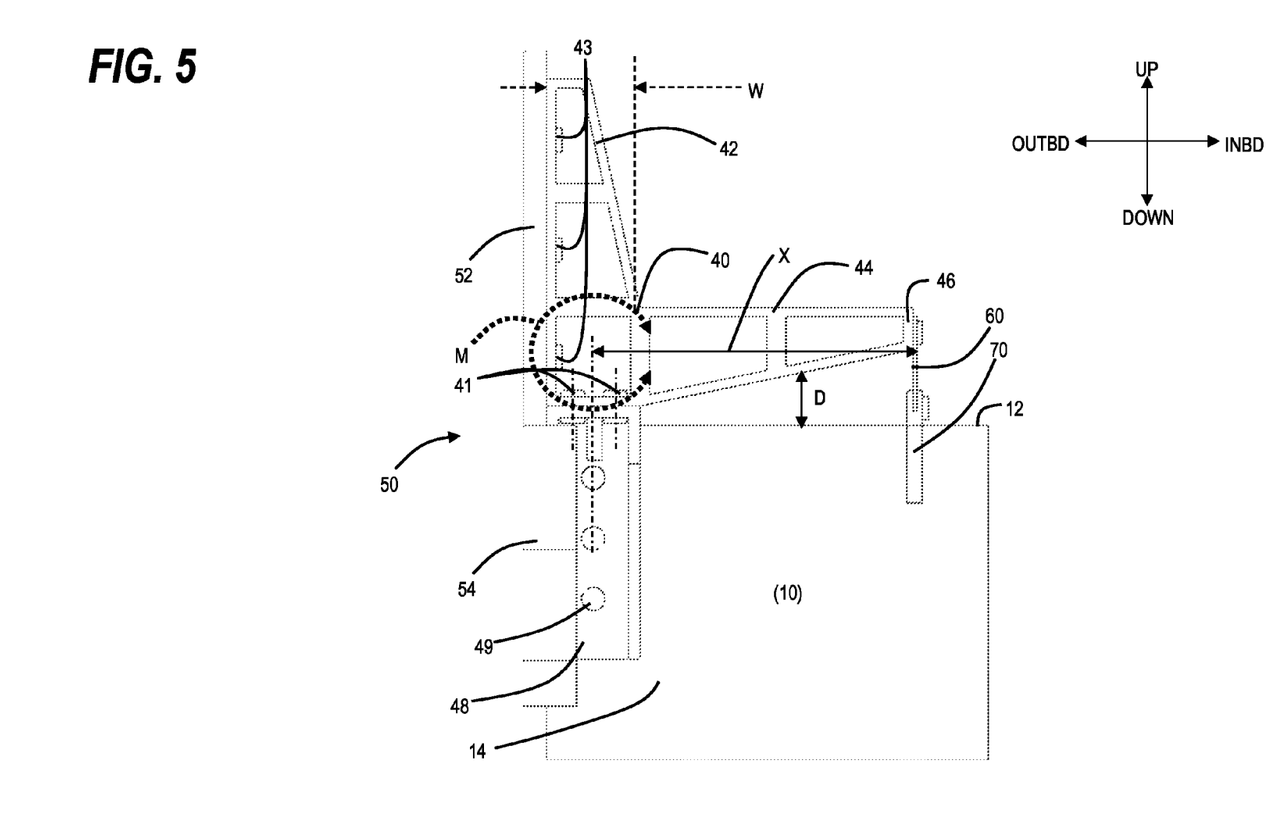
FIG. 5 is a partially cutaway forward or rearward view illustrating a second embodiment of the two-piece attachment member of FIG. 4 joined to a wing box and a fuselage.

FIG. 4 is a partially cutaway isometric view and FIG. 5 is a forward or rearward cutaway view illustrating a second embodiment of a two-piece attachment member 40 joined to a partially illustrated corner section of a wing box 10 and a fuselage structure 50. Similar elements between the various embodiments presented herein will be identified with similar reference numbers. Wing box 10 is partially illustrated to identify an upper surface 12 of the wing box 10 and either a forward or rearward vertical surface 14 of the wing box 10. The two-piece attachment member 40 is similarly located on the outboard member of the wing box 10 to enable fixed attachment to the aircraft body 3 via a fuselage member 50 that may including a fuselage skin 52.

The two-piece attachment member 40 includes an upper extension 42 that is fixedly connected via fasteners 43 to the fuselage member 50, particularly to the fuselage skin 52, and an inboard extension 44 having a distal end 46 opposite the fuselage member 50 being connected via an extension link 60 to a vertical member 14 of the wing box 10 via a wing box fitting 70. Additionally, the two-piece attachment member 40 includes a separate lower extension 48 that is fixedly connected via fasteners 49 to the trapezoid member 54, and to the vertical member 14 of the wing box 10. The upper extension 42 and the lower extension 48 are fixedly connected via fasteners 41.

The inboard extension 44 is oriented a distance D above a plane defined by the upper surface 12 of the wing box 10. A bending moment M, (see FIG. 5), increases the resistance or stiffness to any bending moment from any transient or static loading due to the distal end 46 of the inboard extension 44 having a substantial longitudinal separation from the attachment planes of the upper 42 and lower 48 extensions connected to each other and to their respective fuselage 52 and wing box 10/trapezoid member 54 fastening locations. The inboard distance X of the distal end 46 of the inboard extension 44 to the centerline of the bending moment M is greater than the width W, (see FIG. 5), of the upper 42 and lower 48 extension to accomplish this stiffening feature.

Figure 6:
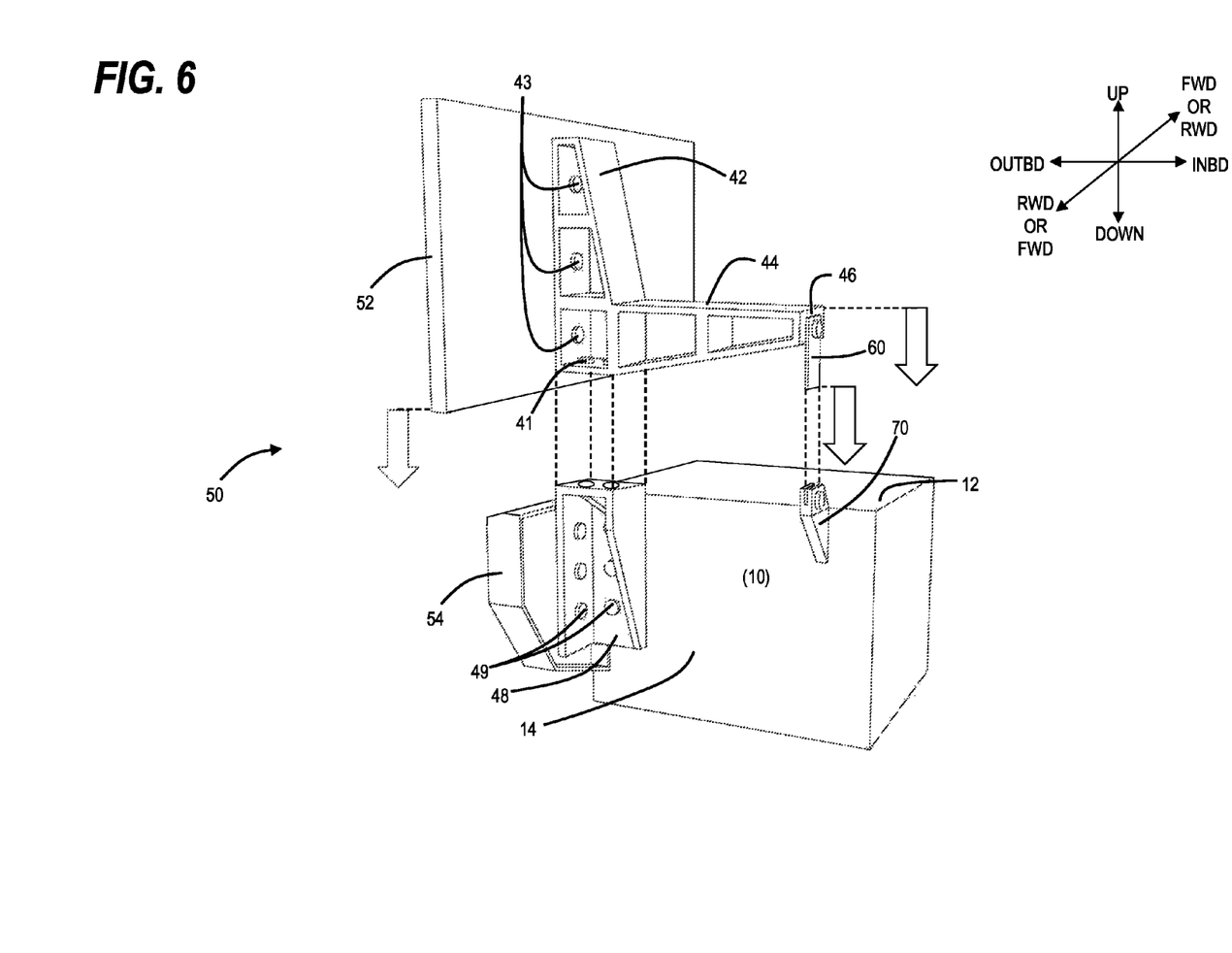
FIG. 6 is an exploded isometric view illustrating a second embodiment of the two-piece attachment member of FIGS. 4-5 in a process of being joined to a wing box and a fuselage.

FIG. 6 illustrates an exploded isometric view of the second embodiment of the two-piece attachment member of FIGS. 4-5 in a method of being joined to a wing box 10 and a fuselage member 50. The method attaches the upper extension 42/inboard extension 44 members to the fuselage member 50, particularly the fuselage skin 52, via fasteners 43. Attachment link 60 may be attached to the distal end 46 of the inboard extension 44 at this time, or may be attached to the wing box fitting 70, (not shown), in the alternative. The method attaches the lower extension 48 to the wing trapezoid member 54, and the vertical member 14 of the wing box 10 via fasteners 49. After the attachment members 48, 54 and 70 are attached to their respective wing box attachment points, and before the upper extension 42 and lower extension 48 are fixedly joined together, any internal cavity in the wing box 10 may be pressure tested to determine its structural integrity.

After pressure testing has occurred, the first assembly including the upper extension 42/inboard extension 44 members and the attached fuselage member 50 are then positioned into alignment with the corresponding second assembly including the lower extension 48 and wing box 10. The first and second assembly are then brought into contact at a connecting bottom member of the upper extension 42 and a connecting top member of the lower extension 48 and fixedly connected with fasteners 41. The attachment link 60 then may be connected between the distal end 46 of the inboard extension 44 and the wing box fitting 70 mounted on the wing box 10.

Additionally, any secondary fuel barrier application process on any external parts of a fuel cell located within the wing box 10 common to the body pressure boundary may be completed in a controlled environment prior to the wing assembly 2 is joined to the aircraft body 3 and will not be penetrated during the wing to body joining The wing assembly 2 carries the majority of the forces through the fuselage 50 to the aircraft body 3 via the attachment members (30 or 40) and the link 60 attachment wing box fitting 70. A first loading condition is present when the aircraft 1 is on the ground, having no lift component on the wing assembly 2, where the attachment members (30 or 40) bear the weight of the aircraft body 3 and transfer it through the wing assembly 2 to main landing gears (not illustrated). Once the aircraft 1 takes off from the ground, a second loading condition is present where the attachment members (30 or 40) transfer a lift load induced by the in-flight wing assembly 2 to the aircraft body 3 via the attachment members (30 or 40) and the link 60 attachment wing box fitting 70.

Figure 7:
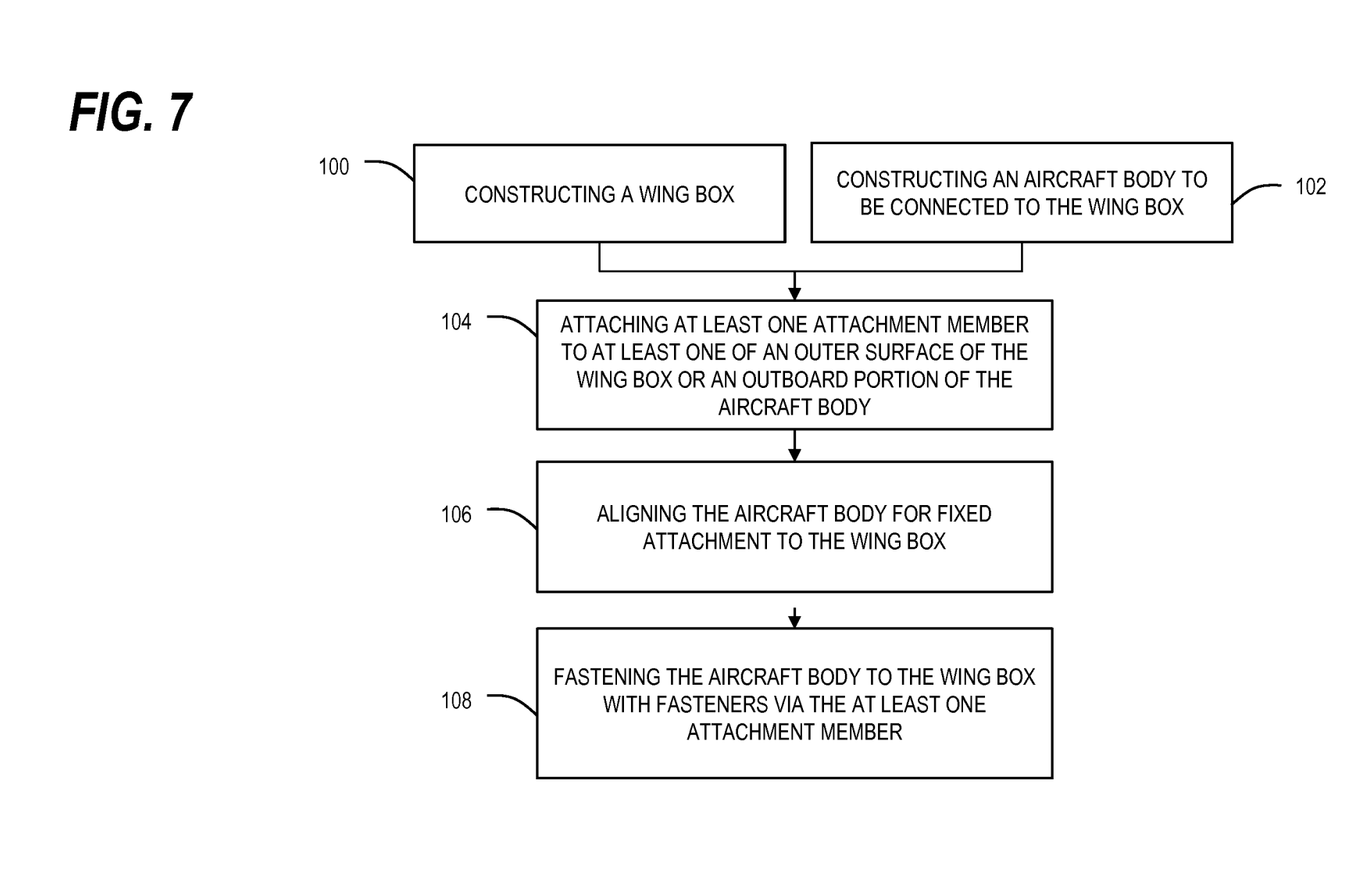
FIG. 7 is a logical flowchart process illustrating a method of attaching a wing assembly to an aircraft body.

FIG. 7 is a logical flowchart process illustrating a method of attaching a wing assembly to an aircraft body as shown in FIG. 6. The method starts with constructing 100 a wing box 10, and constructing 102 the aircraft body 3 to be connected to the wing box 10. An attachment member 30, 40 is attached 104 to either an outer surface 14 of the wing box 10 or an outboard member 52 of the fuselage member 50. As mentioned above, the attachment member may include a one-piece design 30 that is attached to either the wing box 10 or the fuselage member 50, or may include a two-piece design 40 where each respective piece connects to the wing box 10 and the fuselage member 50 and is later joined together. The fuselage member 50 is aligned 106 with the wing box 10 such that the attachment member is either connected to the respective surface of the opposing fuselage member 50 or wing box 10 in the one-piece design 30, or in the two-piece design 40, the upper 42 and lower 48 attachment members are connected together. Additionally, in either the one-piece or two-piece configuration, the attachment link 60 on the inboard extension is aligned with the wing box fitting 70. Finally, the fuselage member 50 is fastened 108 to the wing box 10 with a plurality of fasteners such that the attachment member fixedly holds the fuselage member 50 to the wing box 10.

Figure 8:
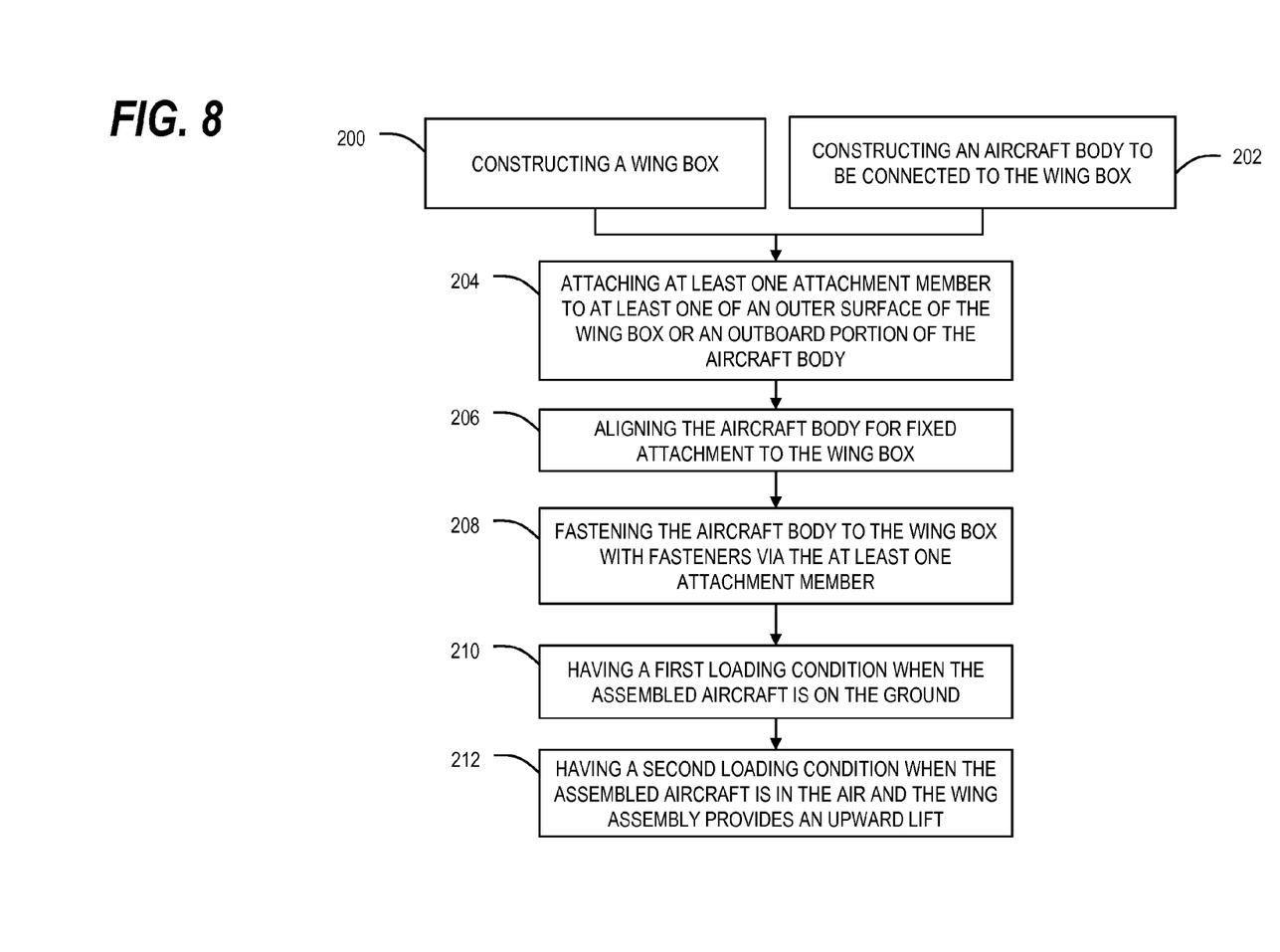
FIG. 8 is a logical flowchart process illustrating a method of loading an aircraft body in a grounded position and an airborne position.

FIG. 8 is a logical flowchart process illustrating a method of loading an aircraft body in a grounded position and an airborne position. Similar to the method described in FIG. 7, a wing box 10 is constructed 200, and an aircraft body 3 is constructed 202 to be connected to the wing box 10. An attachment member 30, 40 is attached 204 to either an outer surface 14 of the wing box 10 or an outboard member 52 of the fuselage member 50. As mentioned above, the attachment member may include a one-piece design 30 that is attached to either the wing box 10 or the fuselage member 50, or may include a two-piece design 40 where each respective piece connects to the wing box 10 and the fuselage member 50 and is later joined together. The fuselage member 50 is aligned 206 with the wing box 10 such that the attachment member is either connected to the respective surface of the opposing fuselage member 50 or wing box 10 in the one-piece design 30, or in the two-piece design 40, the upper 42 and lower 48 attachment members are connected together via fasteners 41. Additionally, in either the one-piece or two-piece configuration, the attachment link 60 on the inboard extension is aligned with wing box fitting 70. The fuselage member 50 is fastened 208 to the wing box 10 with a plurality of fasteners such that the attachment member fixedly holds the fuselage member 50 to the wing box 10. The method further includes a first loading condition 210 when the aircraft 1 is on the ground, with no lift component on the wing assembly 2, where the attachment members 30, 40 bear the weight of the aircraft body 3 and transfer it through the wing assembly 2 and wing box 10 to main landing gears (not shown). Once the aircraft 1 takes off from the ground, a second loading condition 212 is present where the attachment members (30, 40) transfer a lift load induced by the in-flight wing assembly 2 to the aircraft body 3 and fuselage member 50 from the wing assembly 2 through the wing box 10.

The benefits of de-coupling the aircraft body 3 to wing box 10 allows both wing box stringers and the aircraft body stub beams (not shown) to be optimized for weight savings. It also allows the wing assembly 2, and in particular wing box 10, to be independently completed, pressure tested and service ready as desired prior to joining with the aircraft body 3. Aircraft body support members 30, 40 may be fully installed to either the fuselage 50 or the wing box 10 in one-piece embodiment, or separately installed in a two-piece embodiment on the fuselage 50 and the wing box 10 for subsequent attachment. When the one-piece embodiment 30 is fully installed to the fuselage 50 prior to joining of the wing box 10 to the fuselage 50, the build advantage of pressure testing wing box 10 prior to joining to the fuselage 50 will be lost due to attachment fasteners penetration of the wing box 10 fuel barrier at wing to fuselage joining The embodiments disclosed herein allow the aircraft body frame 3 connection to the forward or rearward vertical surface 14 of the wing box 10 to be de-coupled from a common interface of a wing assembly 3 with the wing fuel cell in the wing box 10 by only attaching the aircraft body frame attachment members 30, 40 to the wing assembly 2 wing box 10 through vertical attachment interfaces 32, 38 and 42, 48 outside the wing box 10. This configuration allows the wing box 10 to be completed prior to joining to the aircraft body 3. It also allows the aircraft body frames to be fully installed to the aircraft body skin 52 in one piece prior to joining to the wing 2, thereby reducing weight and eliminating frame splicing of multiple frame parts. This configuration results in a weight savings and less manufacturing work at the wing to body join position by significantly reducing the difficult installation of body frame stub beams to the wing box.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. An aircraft comprising:
   an aircraft body including a fuselage skin on an outboard member of the aircraft body;
   a wing box extending through a member of the aircraft body, the wing box being enclosed and capable of being pressurized; and
   at least one pair of an attachment member and an attachment link member fixedly attached to an outer surface of the wing box and the fuselage skin, the attachment member including
   an upwardly extending projection that receives the outboard member of the aircraft body,
   a downwardly extending member that receives the outboard member of the aircraft body and the outer surface of the wing box, and
   an inboard extending projection that receives the attachment link member being connected to an inboard outer surface of the wing box.

2. The aircraft of claim 1, wherein the attachment member being secured to an outer vertical surface of the wing box by a plurality of fasteners.

3. The aircraft of claim 2, wherein the outer vertical surface of the wing box further comprises one of:
   a forward surface of the wing box; or a
   rearward surface of the wing box.

4. The aircraft of claim 2, wherein the plurality of fasteners are disposed outside of an interior cavity of the wing box.

5. The aircraft of claim 1, wherein the attachment member includes an inboard extension having a distal end disposed an inboard distance from the fuselage skin,
   wherein the attachment link member being connected to the distal end of the inboard extension and the outer surface of the wing box.

6. The aircraft of claim 1, wherein the wing box further comprises a wing fuel cell disposed in an interior cavity of the wing box.

7. An attachment apparatus for an aircraft including an aircraft body having a plurality of body frame members on an outboard member of the aircraft body, and a wing box extending through a member of the aircraft body, the attachment apparatus comprising:
   at least one pair of an attachment member and an attachment link member fixedly attached to an outer surface of the wing box, the attachment member including
   an upwardly extending projection that receives the outboard member of the aircraft body,
   a downwardly extending member that receives the outboard member of the aircraft body and the outer surface of the wing box, and
   an inboard extending projection that receives the attachment link member being connected to an inboard outer surface of the wing box; and
   a plurality of fasteners fixedly attaching the aircraft body to the attachment member and attachment link member, thereby securing the aircraft body to the wing box.

8. The attachment apparatus of claim 7, wherein the attachment member being secured to an outer vertical surface of the wing box by the plurality of fasteners.

9. The attachment apparatus of claim 8, wherein the outer vertical surface of the wing box further comprises one of:
   a forward surface of the wing box; or a
   rearward surface of the wing box.

10. The attachment apparatus of claim 7, wherein the plurality of fasteners are disposed outside of an interior cavity of the wing box.

11. The attachment apparatus of claim 7, wherein the attachment member further comprises:
    an upper extension being connected to fuselage skin on the aircraft body; and a lower
    extension being connected to the fuselage skin on the aircraft body and the wing box,
    the upper extension and lower extension of the attachment member being fixedly attached.

12. The attachment apparatus of claim 7, further comprising:
    a wing fuel cell disposed on an interior cavity of the wing box.

13. The attachment apparatus of claim 12, the plurality of fasteners that fixedly attach the aircraft body to the wing box being outside of the wing fuel cell.

14. A method of assembling an aircraft, the method comprising:
    constructing a wing box;
    constructing an aircraft body to be connected to the wing box; attaching at least one attachment member and an attachment link member fixedly attached to an outer surface of the wing box, the at least one attachment member including
    an upwardly extending projection that receives the outboard member of the aircraft body,
    a downwardly extending member that receives the outboard member of the aircraft body and the outer surface of the wing box, and
    an inboard extending projection that receives the attachment link member being connected to an inboard outer surface of the wing box;
    aligning the aircraft body for fixed attachment to the wing box; and
    fastening the aircraft body to the wing box with fasteners via the at least one attachment member.

15. The method of claim 14, further comprising:
    pressure testing an internal cavity in the wing box after attaching the at least one attachment member to the outer surface of the wing box and before fastening the aircraft body to the wing box.

16. The method of claim 14, further comprising:
    attaching an inboard extension of the at least one attachment member to the outer surface of the wing box at a distance from the outboard member of the aircraft body.

17. The method of claim 14, wherein attaching at least one attachment member further comprises:
    attaching at least one attachment member to one of a forward surface or a rearward surface of an outer vertical surface of the wing box.

18. The method of claim 14, wherein fastening the aircraft body to the wing box further comprises:
    preventing the fasteners from entering an interior cavity of the wing box during fastening.

19. The method of claim 14, wherein the fastening the aircraft body to the wing box further includes fastening the aircraft body to the wing box with fasteners via the upper extension and lower extension of the at least one attachment member.

* * * * *